Aug. 12, 1941.                M. F. WEIDA                2,252,107
                      EXTRUSION MOLDING MACHINE
                      Filed Jan. 11, 1939           3 Sheets-Sheet 1
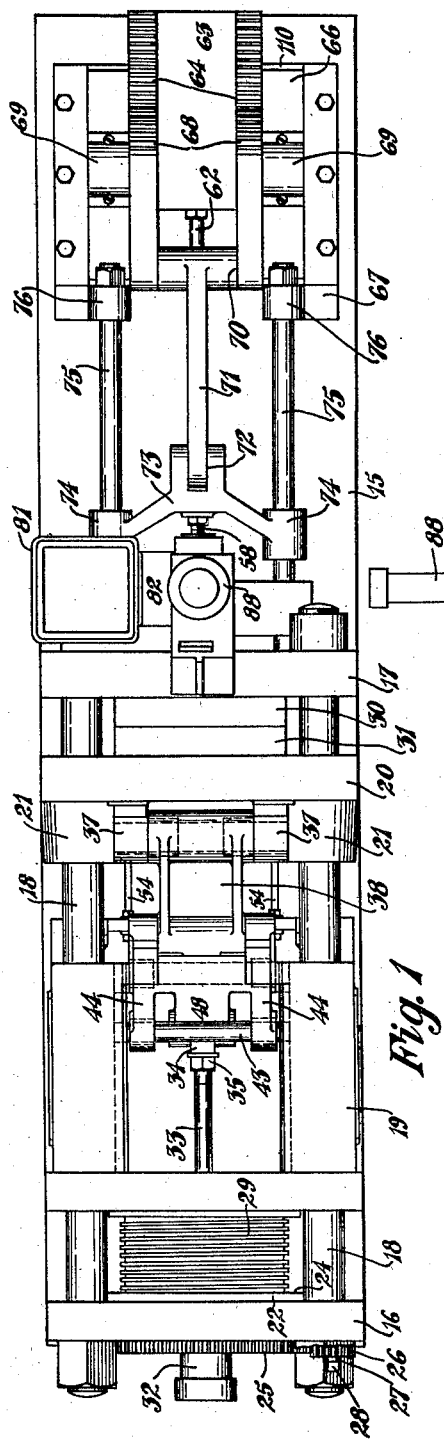
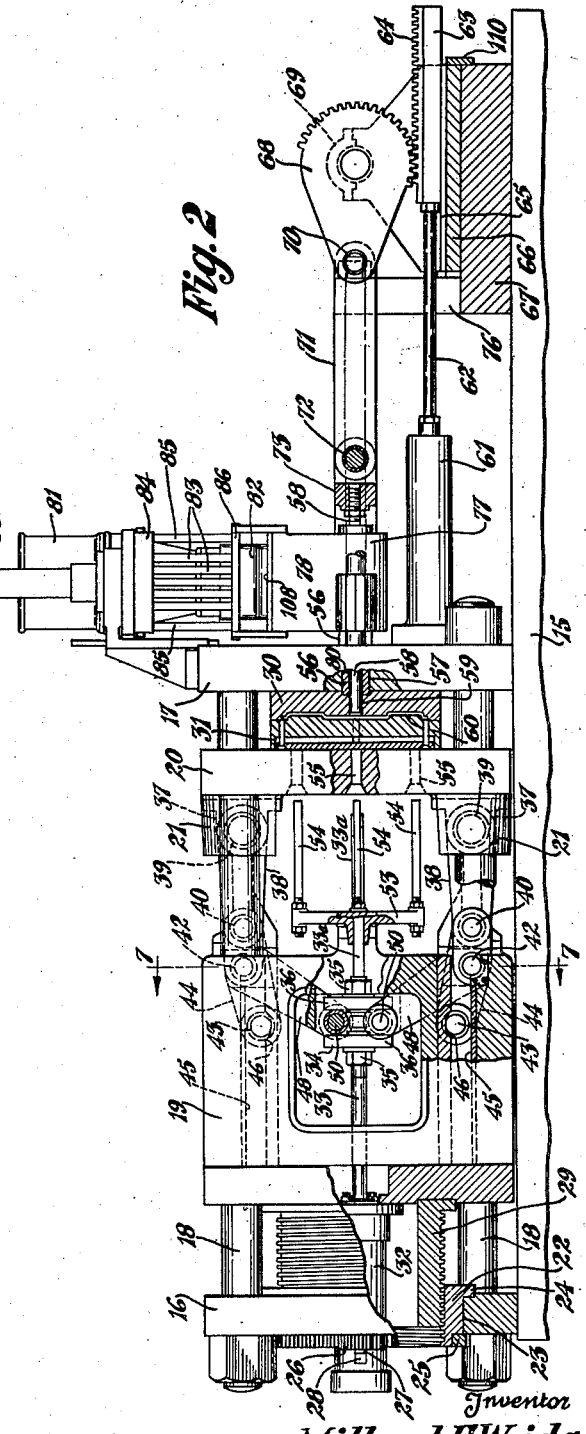
Inventor
Millard F. Weida
By
Frease and Bishop
                Attorneys

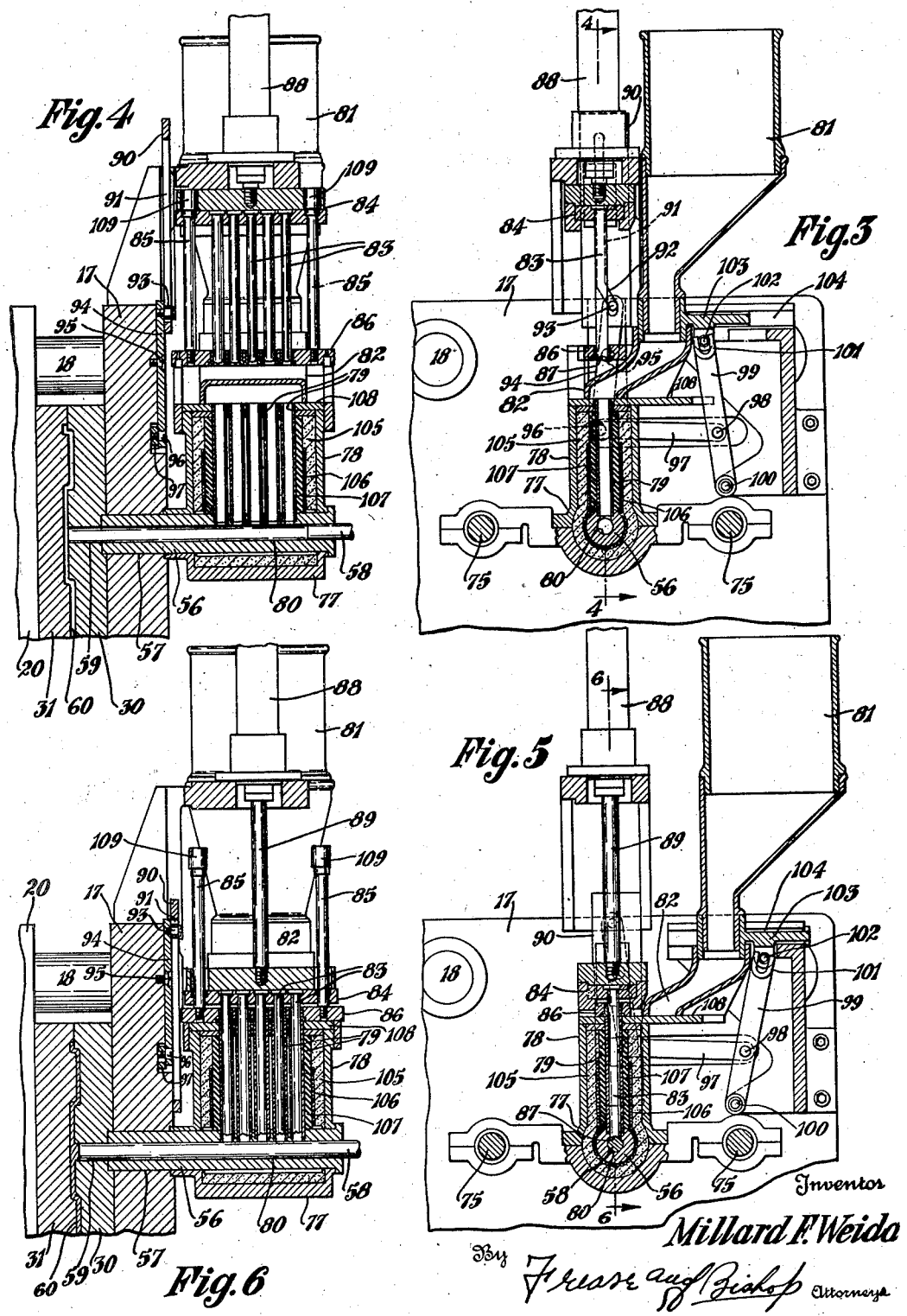

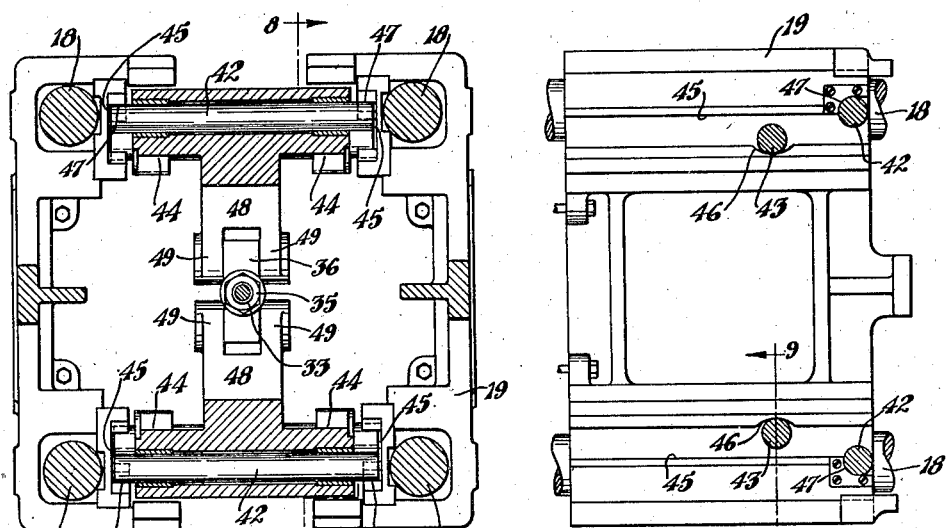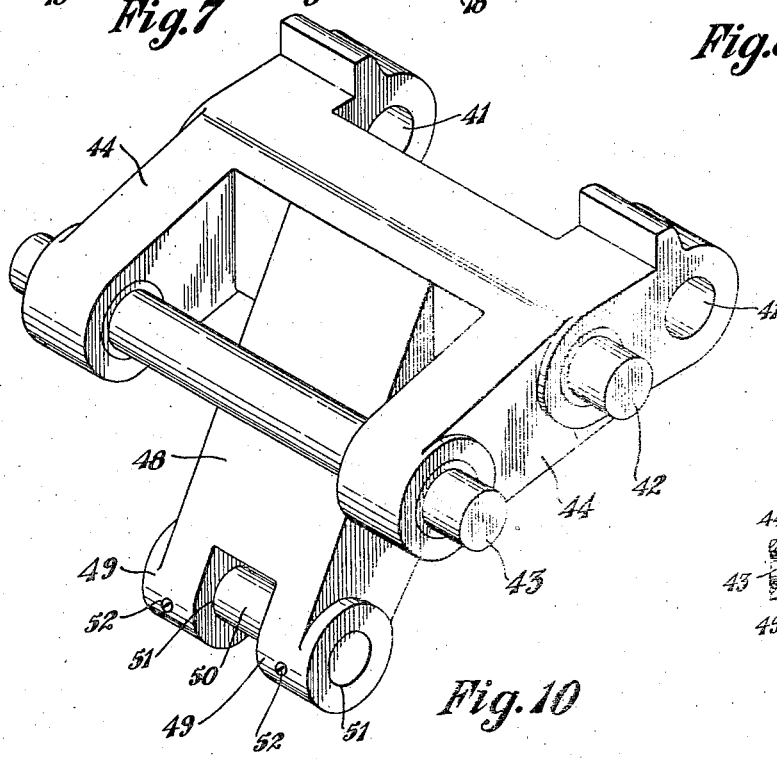

Patented Aug. 12, 1941

2,252,107

UNITED STATES PATENT OFFICE 2,252,107

EXTRUSION MOLDING MACHINE

Millard F. Weida, near Louisville, Ohio

Application January 11, 1939, Serial No. 250,394

11 Claims. (Cl. 18—30)

The invention relates to machines for molding plastics such as cellulose acetates, phenol-formaldehyde and the like, and more particularly to certain improvements upon the type of molding machine disclosed in my co-pending application Serial No. 181,757, filed December 27, 1937.

The type of machine disclosed in said co-pending application provides means for accurately measuring the charge of material so that the exact amount of material required is charged into the machine for each molding operation, the charge being heated in relatively small diameter tubes located directly above the injection cylinder which receives the plastic material under low pressure and from which the material is forced into the mold cavity.

An object of the improvement is to provide improved linkage for closing the molds by a preliminary rapid movement and a final slower movement, the linkage being arranged to hold the mold blocks locked in closed position without the necessity of using fluid pressure for this purpose.

Another object is to provide improved mechanism for delivering the charge of material to the heating and measuring tubes.

The above objects together with others which will be apparent from the drawings and following description or which may be later referred to may be attained by constructing the improved molding machine in the manner illustrated in the accompanying drawings in which:

Figure 1 is a top plan view of the improved extrusion molding machine to which the invention pertains;

Fig. 2, a side elevation of the machine shown in Fig. 1 with parts broken in section for the purpose of illustration;

Fig. 3, an enlarged vertical sectional view of the sliding hopper and plunger mechanism for injecting a charge of material into the heating and measuring tubes, showing the hopper in the charging position with the plungers raised;

Fig. 4, a section taken on the line 4—4, Fig. 3;

Fig. 5, a section similar to Fig. 3, showing the hopper in the initial position and the plungers in the lowered position with the injecting piston shown in the operated position to charge the plastic material into the molds;

Fig. 6, a section taken as on the line 6—6, Fig. 5;

Fig. 7, a transverse sectional view through the machine taken as on the line 7—7, Fig. 2;

Fig. 8, a section on the line 8—8, Fig. 7;

Fig. 9, a detail section on the line 9—9, Fig. 8; and

Fig. 10, an enlarged detached perspective view of one of the T-shape levers.

Similar numerals refer to similar parts throughout the drawings.

The improved molding machine may be mounted upon a base indicated generally at 15 having the spaced stationary uprights 16 and 17 respectively, located near one end of the base and at a point intermediate the ends thereof.

Horizontal guide rods 18 connect the uprights 16 and 17 near the four corner portions thereof, the rectangular frame 19 being mounted for slidable adjustment upon said guide rods, and the head 20 being slidably mounted upon the guide rods and provided at its corner portions with the hollow bosses 21 through which the guide rods are located, for maintaining the head 20 parallel to the upright 17 as said head is slidably moved upon the guide rods.

The frame 19 may be adjusted relative to the upright 16 and held in adjusted position by means of the tubular nut 22, which is journaled within a central opening 23 in the upright 16.

An annular flange 24 is provided on one side of the nut and a ring gear 25 is attached to the other side thereof for holding the nut against lateral movement relative to the upright 16.

A pinion 26 is journaled upon the upright 16 in position to mesh with the ring gear 25 and the shaft 27 thereof has the squared end 28 to which a wrench or other suitable tool may be connected for rotating the nut 22.

A tubular threaded extension 29 is formed upon or attached to the outer end of the adjustable frame 19 and is located through the nut 22.

It will thus be seen that by rotating the nut through the pinion and gear above described, the frame 19 may be horizontally adjusted toward or from the upright 16 and held in any desired adjusted position.

One mold block 30 is attached to the fixed upright 17 and the other mold block 31 is attached to the slidably movable head 20 and adapted to co-operate with the mold block 30 when in the closed or operated position, as shown in Figs. 1 and 2 of the drawings.

A fluid cylinder 32 is carried by the adjustable frame 19 and the piston rod 33 thereof has a crosshead 34 mounted thereon and held in adjusted position as by the nuts 35, said crosshead having two spaced flange portions 36.

Spaced pairs of bearing lugs 37 are carried by the sliding head 20 and one end of a link 38 is journaled between each pair of said bearing lugs, as by a pin or shaft 39, the other end of each link 38 being connected as by a pin or shaft 40 to a T-shape lever such as is shown in detail in Fig. 10, the shaft 40 being journaled through the bearing openings 41 in said T-shape lever.

Pins 42 and 43 are located through the arms 44 of the T-shape lever, and extended into the horizontal guide grooves 45 formed on the inner sides of the adjustable frame 19. A rounded notch 46 is formed in each guide groove at a point spaced from one end, and a notch 47 is formed in the adjacent end of each groove.

The angular arm 48 of each T-shape lever is provided at its end with the spaced ears 49, between which is located a stud or pin 50 located through openings 51 in said ears and held against movement as by pins, set screws or the like as indicated at 52. These studs 50 are received between the flanges 36 of the crosshead 34.

Upon the end of the frame 19 is located a head 53 carrying a plurality of horizontally disposed fingers 54 adapted to be extended through the openings 55 in the head 20 for displacing or knocking out the molded article after each molding operation. As shown in Fig. 2, this head serves as a guide for the extension 33a of the piston rod 33.

In the drawings the mold blocks are shown in the closed position, the studs 43 being located in the notches 46 of the guide grooves and the studs 42 being located in the end notches 47 thereof, the links 38 being thus thrown over center so as to hold the mold blocks tightly together without the necessity of applying fluid pressure at this time from the cylinder 32.

In the open position of the molds, the piston rod 33 is withdrawn from the position shown in the drawings and the crosshead 34 thereon will be located considerably to the left or near to the end of the cylinder 32.

The T-shape levers will remain in connection with said crosshead, both of the pins 42 and 43 thereof being located in the guide grooves 45 to the left of the notches 46 therein.

When it is desired to close the molds, fluid is admitted to the cylinder 32 moving the piston rod 33 outward or to the right as viewed in Figs. 1 and 2, and the head 34 engaging the studs 50 upon the arms 48 of the T-shape levers will slide the said levers forward or to the right, the ends of the pins 42 and 43 thus riding through the guide grooves 45 in the adjustable frame 19 until the parts reach the position, best shown in Fig. 2, with the mold blocks in closed position at which time the pins 42 of the T-shape levers will drop into the notches 47 at the ends of the grooves 45 and the further forward movement of the head 34 will swing the T-shape levers upon the pins 42 as pivots, raising the pins 43 thereof into the notches 46 in the guide grooves throwing the pivotal points 40 of the links 38 over center and locking the movable head 20 with the die block 31 in the closed position as shown in Fig. 2 so that it is not necessary to maintain fluid pressure in the cylinder 32 to hold the die blocks tightly locked in closed position.

When it is desired to open the molds, the cylinder 32 is operated to withdraw the piston rod 33, and as the head 34 moves to the left the T-shape levers will rock inward upon the pins 43 as pivots, until the pins 42 are raised out of the notches 47 at which time the T-shape levers will rock upon the pins 42 as pivots until the pins 43 are moved out of the notches 46 at which time both pins 42 and 43 will slide outward or to the left in the guide grooves 45 as the piston rod is withdrawn.

The movable head 20, carrying the die block 31, will thus be withdrawn to the left, by means of the links 38, connected to the T-shape levers, and the rods or fingers 54 will pass through the openings 55 in the movable head 20 knocking the molded article out of the mold block 31.

Upon the other side of the upright 17 is located the material measuring, heating and injecting mechanism. The injecting cylinder 56 is preferably fixed relative to the upright 17 and may be located through an opening 57 therein, as shown in Figs. 4 and 6.

The injecting piston 58 is arranged to be operated within the cylinder and adapted to be projected through a bore 59 extending to the mold cavity 60.

A fluid cylinder 61 is provided for operating the injecting piston 58, as shown in Fig. 2. The piston 62 of this cylinder is connected at its outer end to a reciprocable rack plate 63 provided with the spaced rack bars 64 at its sides and slidable within ways 65 upon the table 66 which is mounted for slight reciprocating movement upon the bed 67.

A spaced pair of gear segments 68 are journaled in bearings 69 mounted upon the table 66 and mesh with the rack bars 63, as shown in Figs. 1 and 2.

The gear segments 68 are pivotally connected as at 70 to a link 71 which is pivotally connected at its other end, as at 72, to a crosshead 73 provided with the spaced bearing members 74 slidably mounted upon the guide rods 75 which are connected at one end to the upright 17 and at the other end to spaced uprights 76 fixed upon the bed 67. The injecting piston 58 is connected to the central portion of the crosshead 73.

A housing 77 surrounds the injecting cylinder and has an upwardly disposed portion 78 within which is located a series of vertically disposed heating and measuring tubes 79 extending from the top of said housing to the bore 80 of the cylinder 56.

A hopper 81 is located above and to one side of the heating and measuring tubes 79 and is arranged to be reciprocated so that the angular spout 82 thereof may be brought into position directly above the heating and measuring tubes, as shown in Figs. 3 and 4, in order to charge material from the hopper into the tubes.

Located directly above the tubes 79 is a series of plungers 83 carried upon a vertically reciprocable plate 84 slidable upon the vertical guide rods 85, and through openings in the movable plate 86 upon which said guide rods are supported.

The lower ends of the plungers 83 are concaved, as at 87, so as to fit around the injection piston 58, as shown in Figs. 5 and 6.

A fluid cylinder 88 is mounted above the plungers 83 and the piston rod 89 of said cylinder is connected to the vertically reciprocable plate 84 for the purpose of reciprocating the plungers relative to the tubes 79.

A slotted plate 90 is fixed to one side of the reciprocable head 84 and provided with a vertical slot 91 having the angular lower end portion 92.

This slot engages a pin or roller 93 upon the upper end of a lever 94 fulcrumed, as at 95, upon a stationary portion of the machine, the lower end of the lever being pivotally connected, as at 96, to one end of a link 97, the other end of which is pivotally connected, as at 98, to an intermediate portion of the lever 99 fulcrumed at its lower end, as indicated at 100, to a stationary portion of the device.

The upper end of the lever 99 is provided with a fork 101 engaging a pin or roller 102 upon a sliding plate 103, which is horizontally slidable in the guide ways 104, the hopper 81 being fixed upon said sliding plate.

Heat insulating material 105 may be located around the tubes 79 within the housing 77—78, and electric heating elements 106 are located within said housing for heating the material within the tubes 79, the electric insulation material 107 being preferably located between said heating elements and the housing.

In the operation of the machine, granular or powdered material is placed in the hopper 81 and with the hopper in the position shown in Figs. 3 and 4, this material will be fed by gravity into the tubes 79, accurately measuring the proper amount of material.

The fluid cylinder 88 is then operated and as the piston 89 thereof starts to descend, carrying with it the reciprocating plate 84, the slotted plate 90 will start to move down and the pin or roller 93, upon the lever 94, will move quickly to the left as it rides up in the short angular portion 92 of the slot 91, swinging the lever 94 upon its fulcrum and through the link 97 swinging the lever 99 to the right and moving the sliding plate 103 and with it the hopper 81 to the position shown in Fig. 5, the lower open end of the angular spout 82 of the hopper riding across the table 108 so as to prevent any of the material from being discharged from the hopper.

As the reciprocating plate 84 is lowered the movable plate 86 will be lowered therewith, being suspended from the plate 84 as by the heads 109 upon the guide rods 85, until the movable plate 86 comes to rest upon the table 108 at the upper end of the tubes 79, after which the reciprocating plate 84 may continue to travel downward, the plungers 83 carried thereby moving down through the tubes 79 and ejecting therefrom the material which has been quickly heated and reduced to the plastic consistency of about putty, all of the material being ejected from the tubes 79 into the bore 80 of the injection cylinder 56.

The cylinder 61 is then operated and through the rack bars 64 the gear segments 68 are operated to the position shown in Figs. 1 and 2 and through the link 71 and crosshead 73, the injection piston 58 is moved through the cylinder 56 forcing all of the plastic material from the injection cylinder into the mold cavity 60 formed in the mold blocks 30 and 31, the injection piston assuming the position best shown in Figs. 2 and 6.

The fluid cylinder 32 on the other side of the machine is then operated, in the manner above described to withdraw the piston 33 and open the molds, all as described in detail above.

In the event that the molded articles might stick in the mold block 30, means is provided for ejecting the same. It will be noted that in Fig. 2, the table 66 is shown with its outer end against a stop 110 upon the bed 67 while its inner end is slightly spaced from the uprights 76 upon said bed.

With the parts in this position when the fluid cylinder 61 is operated to withdraw the piston 62, the first movement of the rack bars 64 will, through the gear segments 68 cause the table 66 to slide inward or to the left until it abuts the uprights 67 thus moving the injection piston 58 the corresponding distance inward or to the left ejecting the molded article from the mold block 30.

Further inward movement of the piston 62 will cause the rack bars 64 to rotate the gear segments 68 withdrawing the injecting piston 58 to the position shown in Fig. 4. It should be understood, however, that in the same manner described in my co-pending application above referred to, the injecting piston is not withdrawn until the tubes 79 have again been filled with the granular or powdered material.

Upon the upward movement of the piston 89 of the fluid cylinder 88, the pin or roller 93 upon the lever 94 will ride in the straight portion slot 91 until the plungers 83 are almost to the upper limit of their movement.

In the meantime, the heads 109 upon the guide rods 85 will be engaged by the reciprocating plate 84 and the movable plate 86 will be raised to the position shown in Fig. 4.

As the pin or roller 93 then rides through the angular portion 92 of the slot in the reciprocating plate 90 the levers and linkage 94—97, above described, will be operated to the position shown in Fig. 3, sliding the hopper 81 to the position shown in said figure so that the granular or powdered material therein will be fed by gravity into the tubes 79 and the operation will be continued as above described.

I claim:

1. An extrusion molding machine including a stationary support, a head movable toward and from said support, complementary mold blocks carried by the support and head, a crosshead means for reciprocating the cross-head toward and from said support, T-shape levers having the ends of their upright arms pivotally connected to said crosshead, links pivotally connecting one end of the cross arm of each of said T-shape levers to said movable head, pins upon the other ends of the cross arms and at the intersections of the cross arms and upright arms of said T-shape levers, a frame having horizontal guide ways in which said pins are movable, and oppositely disposed notches in the inner ends and intermediate the ends of said guide ways for receiving said end pins and intermediate pins respectively for throwing said links over center when the mold blocks are in closed position.

2. An extrusion molding machine including a stationary support, a head movable toward and from said support, complementary mold blocks carried by the support and head, a crosshead means for reciprocating the cross-head toward and from said support, T-shape levers having their stems pivotally connected to said crosshead, links pivotally connecting one end of the head of each of said T-shape levers to said movable head, pins upon the other ends of the heads and at the intersections of the heads and stems of said T-shape levers, a frame having horizontal guide ways in which said pins are movable, and oppositely disposed notches in the inner ends and intermediate the ends of said guide ways for receiving said end pins and intermediate pins respectively for throwing said links over center when the mold blocks are in closed position.

3. An extrusion molding machine including a stationary support, a head movable toward and from said support, complementary mold blocks carried by the support and head, a crosshead means for reciprocating the cross-head toward and from said support, T-shape levers having the ends of their upright arms pivotally connected to said crosshead, links pivotally connecting one end of the cross arm of each of said T-shape levers to said movable head, pins upon the other ends of the cross arms and at the intersections of the cross arms and upright arms of said T-shape levers, a frame having horizontal guide ways in which said pins are movable, and oppositely disposed notches in the inner ends and intermediate the ends of said guide ways for receiving said end pins and intermediate pins respectively for throwing said links over center when the mold blocks are in closed position.

4. An extrusion molding machine including a mold, an injection cylinder communicating with the mold, a piston in said cylinder, a series of substantially upright measuring and heating tubes communicating with the cylinder, a material containing hopper for discharging material into said tubes, reciprocable plungers positioned above the tubes for discharging the material from the tubes into the cylinder, means for alternately moving the hopper to and from position to register with the tubes, means for moving the plungers entirely through the tubes to the point of communication between the tubes and the cylinder so as to eject all of the material from the tubes and to cut off the communication between the tubes and the cylinder and means for operating the piston for discharging material from the cylinder into the mold.

5. An extrusion molding machine including a mold, an injection cylinder communicating with the mold, a piston in said cylinder, a series of substantially upright measuring and heating tubes communicating with the cylinder, a material containing hopper for discharging material into said tubes, reciprocable plungers positioned above the tubes for discharging the material from the tubes into the cylinder, means operated by the plungers for alternately moving the hopper to and from position to register with the tubes, means for moving the plungers entirely through the tubes to the point of communication between the tubes and the cylinder so as to eject all of the material from the tubes and to cut off the communication between the tubes and the cylinder and means for operating the piston for discharging material from the cylinder into the mold.

6. An extrusion molding machine including a mold, an injection cylinder communicating with the mold, a piston in said cylinder, a series of substantially upright measuring and heating tubes communicating with the cylinder, a material containing hopper for discharging material into said tubes, reciprocable plungers positioned above the tubes for discharging the material from the tubes into the cylinder, means for raising and lowering the plungers, means operated by the plungers for moving the hopper to position to register with the tubes when the plungers are raised, and when the plungers are lowered for moving the hopper away from the tubes, means for moving the plungers entirely through the tubes to the point of communication between the tubes and the cylinder so as to eject all of the material from the tubes and to cut off the communication between the tubes and the cylinder and means for operating the piston for discharging material from the cylinder into the mold.

7. An extrusion molding machine including a mold, an injection cylinder communicating with the mold, a piston in said cylinder, a series of substantially upright measuring and heating tubes communicating with the cylinder, a horizontally reciprocable material containing hopper for discharging material into said tubes, reciprocable plungers positioned above the tubes for discharging the material from the tubes into the cylinder, means for alternately reciprocating the hopper to and from position to register with the tubes, means for moving the plungers entirely through the tubes to the point of communication between the tubes and the cylinder so as to eject all of the material from the tubes and to cut off the communication between the tubes and the cylinder and means for operating the piston for discharging material from the cylinder into the mold.

8. An extrusion molding machine including a mold, an injection cylinder communicating with the mold, a piston in said cylinder, a series of substantially upright measuring and heating tubes communicating with the cylinder, a substantially horizontally reciprocable material containing hopper for discharging material into the tubes, substantially vertically reciprocable plungers above the tubes for discharging the material from the tubes into the cylinder, means operable by the plungers for moving the hopper into position to register with the tubes when the plungers are raised, and when the plungers are lowered for moving the hopper away from the tubes, means for moving the plungers entirely through the tubes to the point of communication between the tubes and the cylinder so as to eject all of the material from the tubes and to cut off the communication between the tubes and the cylinder and means for operating the piston for discharging the material from the cylinder into the mold.

9. An extrusion molding machine including a mold, an injection cylinder communicating with the mold, a piston in said cylinder, a series of substantially upright measuring and heating tubes communicating with the cylinder, a substantially horizontally reciprocable material containing hopper for discharging material into the tubes, substantially vertically reciprocable plungers positioned above the tubes for discharging the material from the tubes into the cylinder, means operable by the plungers for moving the hopper into position to register with the tubes when the plungers are raised, and when the plungers are lowered for moving the hopper away from the tubes, a movable guide plate engaging the plungers and vertically movable from a position away from the tubes to a position upon the tubes, means operated by the movement of the plungers for lowering the movable guide plate upon the tubes as the plungers move downward and for raising the guide plate as the plungers move upward, means for moving the plungers entirely through the tubes to the point of communication between the tubes and the cylinder so as to eject all of the material from the tubes and to cut off the communication between the tubes and the cylinder and means for operating the piston for discharging the material from the cylinder into the mold.

10. An extrusion molding machine including a mold, an injection cylinder communicating with the mold, a piston in said cylinder, a series of substantially upright measuring and heating tubes communicating with the cylinder, a substantially horizontally reciprocable material containing hopper for discharging material into the tubes, substantially vertically reciprocable plungers above the tubes for discharging the material from the tubes into the cylinder, lever and link means operable by the plungers upon movement thereof for moving the hopper into position to register with the tubes and upon downward movement of the plungers for moving the hopper away from the tubes, means for moving the plungers entirely through the tubes to the point of communication between the tubes and the cylinder so as to eject all of the material from the tubes and to cut off the communication between the tubes and the cylinder and means for operating the piston for discharging the material from the cylinder into the mold.

11. An extrusion molding machine including a mold, an injection cylinder communicating with the mold, a piston in said cylinder, a series of substantially upright measuring and heating tubes communicating with the cylinder, a substantially horizontally reciprocable material containing hopper for discharging material into the tubes, substantially vertically reciprocable plungers above the tubes for discharging the material from the tubes into the cylinder, a slotted plate movable with the plungers and having a cam slot therein, a lever having a pin located in said slot, means operatively connecting the lever to the hopper, means for moving the plungers entirely through the tubes to the point of communication between the tubes and the cylinder so as to eject all of the material from the tubes and to cut off the communication between the tubes and the cylinder, and means for operating the piston for discharging the material from the cylinder into the mold.

MILLARD F. WEIDA.